United States Patent [19]

Kato et al.

[11] 4,155,253

[45] May 22, 1979

[54] TURBINE FLOWMETER

[75] Inventors: Mahiko Kato, Tokyo; Shigeo Sugiyama, Fujisawa; Hiroyuki Amemori, Kawasaki; Kazuhiko Nakayama; Kensuke Aizawa, both of Yokohama, all of Japan

[73] Assignee: Tokico Ltd., Kawasaki, Japan

[21] Appl. No.: 843,169

[22] Filed: Oct. 17, 1977

[30] Foreign Application Priority Data

Oct. 20, 1976 [JP] Japan .............................. 51-125730
Jan. 10, 1977 [JP] Japan .............................. 52-747

[51] Int. Cl.² ........................................ G01F 1/12
[52] U.S. Cl. ............................... 73/231 R; 415/104
[58] Field of Search ............... 73/230, 231 R; 415/104

[56] References Cited

U.S. PATENT DOCUMENTS

| 3,238,776 | 3/1966 | Potter | 73/231 R |
| 3,559,483 | 2/1971 | Freund | 73/231 R |
| 3,756,079 | 9/1973 | November | 73/231 R |

FOREIGN PATENT DOCUMENTS

| 190444 | 9/1966 | Japan | 73/231 R |
| 1174400 | 12/1969 | United Kingdom | 73/231 R |

*Primary Examiner*—James J. Gill
*Attorney, Agent, or Firm*—Haseltine, Lake & Waters

[57] ABSTRACT

A turbine flowmeter comprises a rotor comprising a hub rotatably supported on a shaft at an axial position of a flowmeter housing and a plurality of blades embeddedly fixed to the outer peripheral surface of said hub, means for detecting the rotation of said rotor, and a couple of cone members disposed respectively on the up-stream side and the down-stream side in the flow direction of a fluid being measured to confront at least one surface of the hub of said rotor in coaxial alignment with said rotor. The diameter of at least one cone member of the couple of cone members, at the side to confront said rotor, is larger than outer diameter of the hub of said rotor, whereby a stagnant fluid region is formed between the enlarged diameter part of said cone member and the outer peripheral surface of said hub for holding in stagnant state a part of said fluid being measured.

3 Claims, 17 Drawing Figures

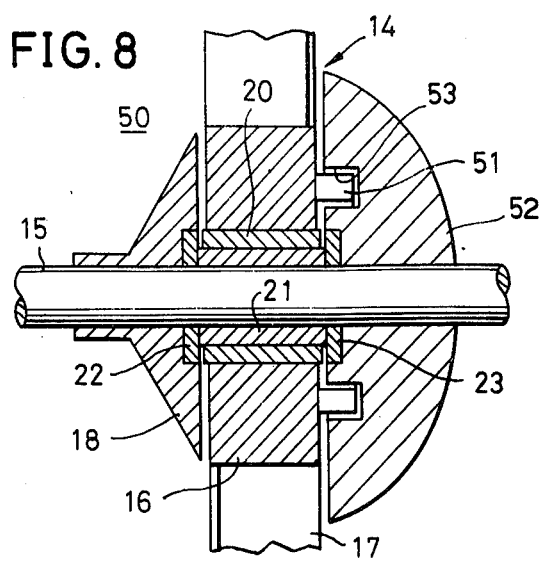
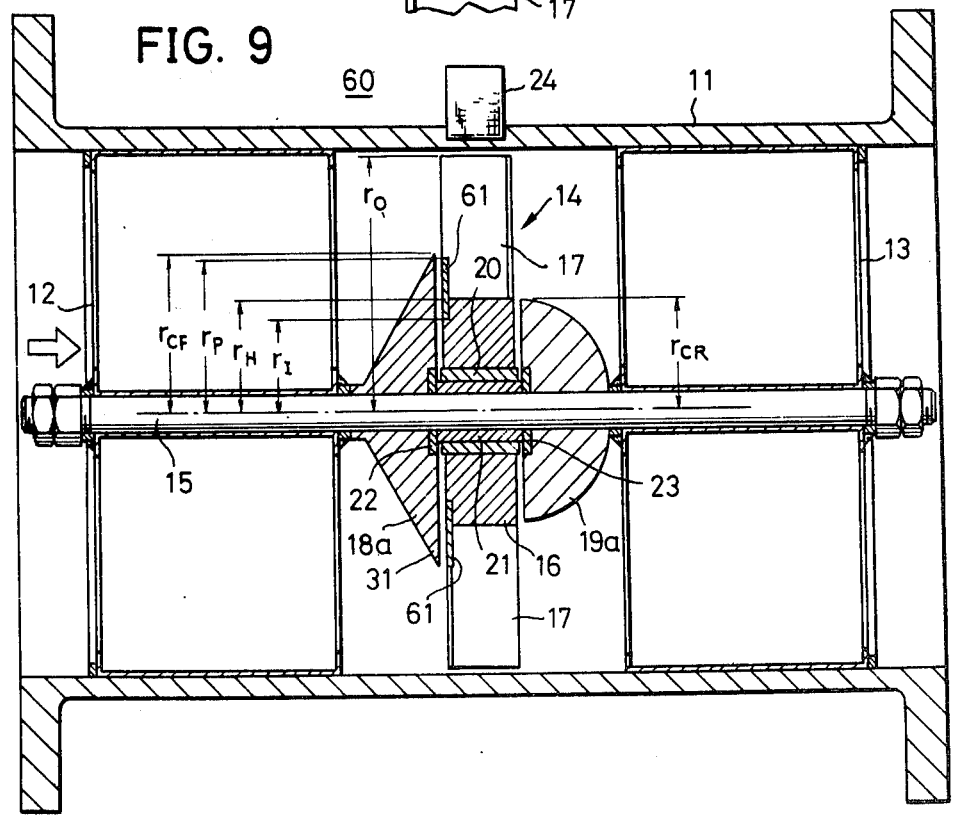

TURBINE FLOWMETER

BACKGROUND OF THE INVENTION

The present invention relates generally to a turbine flowmeter, and more particularly to a turbine flowmeter having a structure for developing viscous resistance and being capable of measuring not only low-viscous fluids but also high-viscous fluids having high viscosities, in particular, with excellent instrumental error characteristic.

A conventional turbine flowmeter is not accompanied by any problems in the case of measuring the flow quantity of a low-viscosity fluid such as water or gasoline but, in the case of measuring the flow quantity of a high-viscosity fluid such as heavy oil, is accompanied by difficulties such as large instrumental error and a narrow rangeability resulting therefrom, as will be described hereinafter.

In general, between the flow rate Q and the rotational angular velocity $\omega$ there is the following relationship, $$(\omega/Q) = (\tan \alpha/rA) - (Tf/r^2\rho Q^2) - (Tm/r^2\rho Q^2) \quad (1)$$

where $\alpha$ is the angle of the turbine blades with respect to the pipe axis, r is the average radius of the blades, A is the area of the annulus defined by the inner and outer circumferences of the blades, Tf is the rotational resistance torque of the vane wheel or rotor caused by the fluid viscosity, Tm is the rotational resistance torque of the rotor caused by mechanical resistance, and $\rho$ is the fluid density.

Here, since rotational resistance torque Tm caused by mechanical resistance is negligibly small in comparison with the rotational resistance torque Tf caused by the fluid viscosity, the above described relationship may be considered to be as follows.

$$(\omega/Q) = (\tan \alpha/rA) - (Tf/r^2\rho Q^2) \quad (1a)$$

In the case where viscosity factor of the fluid is designated by $\mu$, the rotational resistance torque Tf is representend, depending on the flow conditions, as follows.

$$Tf \propto \begin{cases} \rho^{1/2}\mu^{1/2}Q^{3/2} & \text{(in the case of laminar flow)} \quad (2) \\ \rho Q^2 - k\mu Q & \text{(in the case of transition flow between laminar flow and turbulent flow)} \quad (3) \\ \rho Q^2 & \text{(in the case of turbulent flow)} \quad (4) \end{cases}$$

Accordingly, flow rate to rotational angular velocity ratio $\omega/Q$ is represented as follows, $$\frac{\omega}{Q} = \begin{cases} \frac{\tan \alpha}{rA} - K_1\sqrt{\frac{\mu}{\rho Q}} & \text{(in the case of laminar flow)} \quad (5) \\ \frac{\tan \alpha}{rA} - K_2 + K_3\frac{\mu}{\rho Q} & \text{(in the case of transition flow between laminar flow and turbulent flow)} \quad (6) \\ \frac{\tan \alpha}{rA} - K_2 & \text{(in the case of turbulent flow)} \quad (7) \end{cases}$$

where $K_1$, $K_2$, and $K_3$ are constants, respectively, and $\tan \alpha/rA$ is a specific value determined by design.

As will be observed from the Equations (5), (6), and (7), that $\omega/Q$ is constant irrespective of the flow rate Q, in the case of turbulent flow, whereby no instrumental error occures. In the case of the laminar flow and transition flow, however, $\omega/Q$ is a function of the flow rate Q, whereby the instrumental error is caused to vary depending on the flow rate. Accordingly, in the case of measuring a low-viscosity fluid by means of a known turbine flowmeter, there occurs little change in the instrumental error because the low-viscosity fluid assumes turbulence flow from a relatively low flow rate region in the flow rate measuring range. In contrast, in the case of measuring a high-viscosity fluid, there arises a difficulty in that the instrumental error changes greatly as the flow rate varies because the high-viscosity fluid flows in laminar flow state up to a relatively high flow rate region, and the turbulence flow region within the flow rate measuring range is thereby small.

Moreover, the flow velocity distribution is different in laminar flow, transition flow, and turbulence flow. Accordingly, the point of application of rotational torque acting on the blades changes according to the flowing state, which results in changes of the above mentioned average radius r, whereby the instrumental error is not constant. As a consequence, the known turbine flowmeter exhibits a large change in instrumental error in particular with respect to a high-viscosity fluid which flows in the state of laminar flow up to a relatively high flow rate region, whereby accurate flow rate measuring with wide range-ability cannot be carried out.

Furthermore, even in the case where the rotor is normally supported rotatably at opposite ends thereof in the known turbine flowmeter, the fluid impinging on the blades exerts a thrust on the blade wheel in the flow direction, and a part such as a bushing of the rotor makes contact with a bearing of the blade wheel and thereby imparts a complicated rotational resistance to the blade wheel thereby to cause the bearing to develop a large rotational resistance. As a result, the term of the mechanical resistance torque Tm in the Equation (1) is no longer negligible, which thereby generates a large measuring error in all flow rate regions. Another possible adverse result is uneven contact of the rotor shaft in a bearing, whereby the bearing wears rapidly until it becomes useless in a short time.

SUMMARY OF THE INVENTION

Accordingly, it is a general object of the present invention to provide a novel and useful turbine flowmeter in which the above described difficulties have been overcome.

Another object of the present invention is to provide a turbine flowmeter having a blade rotor in which a viscous resistance developing part is formed and/or a cone provided in connection with the rotor. According to the turbine flowmeter of the present invention, high-viscosity fluids as well as low-viscosity fluids can be measured with an excellent instrumental error characteristic from a low flow rate region up to a high flow rate region.

Still another object of the present invention is to provide a turbine flowmeter having a viscous resistance developing structure which is formed by making the diameter of at least one cone, of a couple of cones, disposed at the front and rear of the blade rotor, large in comparison with that of the hub of the blade rotor.

A further object of the present invention is to provide a turbine flowmeter further having resistance force developing sections formed in the blade rotor and a cone.

A still further object of the present invention is to provide a turbine flowmeter further having a back pressure receiving section formed on the blade rotor.

Other objects and further features of the invention will be apparent from the following detailed description when read in conjunction with the accompanying drawings.

BRIEF DESCRIPTION OF THE DRAWINGS

In the drawings:

FIG. 8 is a partial side view, in longitudinal section, showing an essential part of a fifth embodiment of the turbine flowmeter according to the present invention;

FIG. 9 is a side view, in longitudinal section, showing a sixth embodiment of the turbine flowmeter according to the present invention;

DETAILED DESCRIPTION

Figure 1:
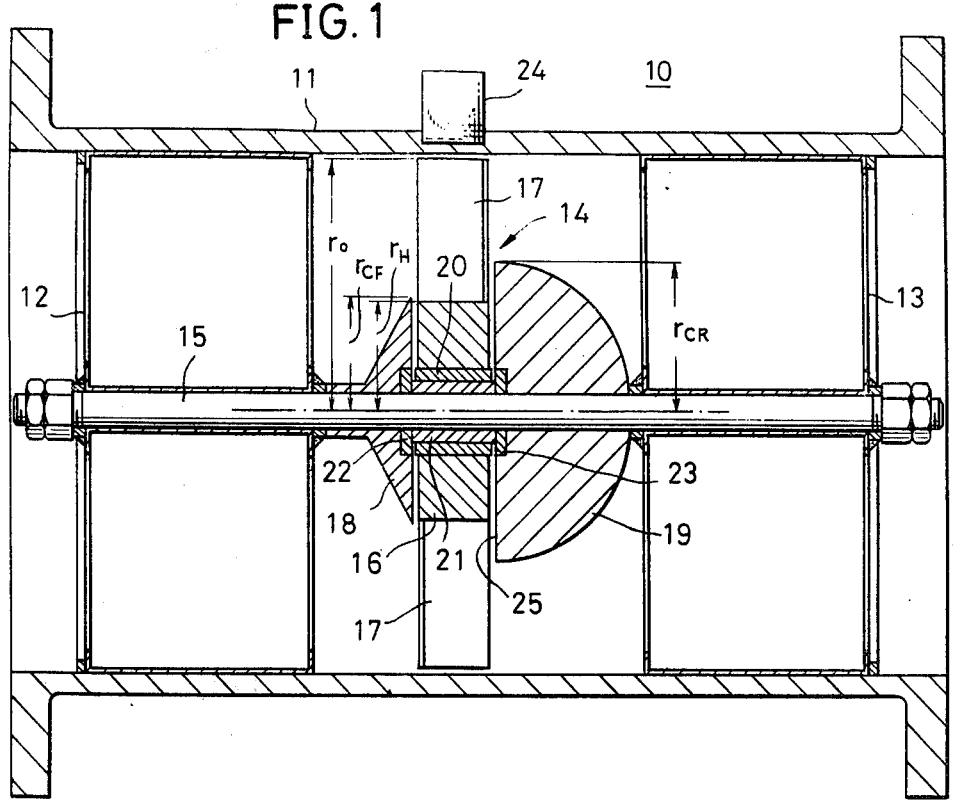
FIG. 1 is a side view, in longitudinal section, showing a first embodiment of the turbine flowmeter according to the present invention.

Referring to FIG. 1, a first embodiment of the flowmeter according to the present invention will now be described.

A couple of clips 12 and 13 are disposed, in mutually spaced apart relation, within a cylindrical housing 11 of a turbine flowmeter 10. Between the clips 12 and 13, a shaft 15 of a rotor 14 serving as a blade wheel is supported at opposite ends thereof by the clips 12 and 13. The rotor 14 comprises a hub 16 of a radius rH and a plurality of vanes or blades 17 embeddedly fixed to the hub 16 with mutually equally spaced relationship and with an inclination of an angle α. A bush 20 inserted into and fixed to a central hole of the hub 16 is rotatably engaged with a journal 21 of the shaft 15.

A cone member 18 on the up-stream side is of conical shape and is coaxially fixed to the shaft 15 between the clip 12 and the rotor 14. Another cone member 19 on the down-stream side is coaxially fixed to the shaft 15 between the rotor 14 and the clip 13. Thrust bearings 22 and 23 are respectively fixed to the end faces, confronting each other, of the up-stream and down-stream side cones 18 and 19 and are adapted to receive any axial force of the rotor 14. A pickup coil 24 is fixed to the outer wall of the housing 11 to confront the blades 17 of the rotor 14 and is adapted to electrically detect rotation of the rotor 14.

A high-viscosity liquid introduced into the housing 11 from the up-stream side of the turbine flowmeter 10 passes through the clip 12 and is guided by the up-stream side cone member 18 toward the blades 17, thereby flowing against the blades 17 of the rotor 14 to rotate it. Thereafter, the fluid flows out to the down-stream side.

In the first embodiment of the turbine flowmeter, the up-stream side cone member 18 is so adapted that its radius $r_{CF}$ is approximately the same as the radius $r_H$ of the hub 16 of the rotor 14, that is, $r_{CF}=r_H$. On the one hand, the down-stream side cone member 19 is so adapted that its radius $r_{CR}$ is greater than the radius $r_H$ of the hub 16, that is, $r_{CR}>r_H$. The resulting annular part of the cone member 19 projecting or extending in the radial direction beyond the periphery of the hub 16 constitutes a viscous resistance developing section 25. Accordingly, the fluid passing by near the proximal ends of the blades 17 of the rotor 14 impinges against the viscous resistance developing section 25. As a result, the fluid to be measured is caused to be stagnant within a space defined by the outer peripheral surface of the hub 16 and the viscous resistance developing section 25.

The fluid to be measured, being stagnant within the above described space, assumes a state wherein the velocity component thereof in the axial direction is substantially lost. For this reason, a laminar flow viscous resistance against the blades 17 is developed at the proximal part thereof, whereby a rotational resistance torque $k\mu Q$ is added to the rotation of the rotor 14.

Accordingly, the rotational resistance torque T′f of the turbine flowmeter 10 may be represented as follows.

$$T'f \propto \begin{cases} \rho^{1/2} \mu^{1/2} Q^{3/2} + k\mu Q & \text{(in laminar flow)} \quad (2a) \\ \rho Q^2 & \text{(in transition flow)} \quad (3a) \\ \rho Q^2 + k\mu Q & \text{(in turbulent flow)} \quad (4a) \end{cases}$$

In accompaniment with this, the ratio ω/Q of rotational angular velocity to flow rate is expressed as follows.

$$\frac{\omega}{Q} = \begin{cases} \dfrac{\tan \alpha}{rA} - K_1 \sqrt{\dfrac{\mu}{\rho Q}} - K_3 \dfrac{\mu}{\rho Q} & \text{(in laminar flow)} \quad (5a) \\ \dfrac{\tan \alpha}{rA} - K_2 & \text{(in transition flow)} \quad (6a) \\ \dfrac{\tan \alpha}{rA} - K_2 - K_3 \dfrac{\mu}{\rho Q} & \text{(in turbulent flow)} \quad (7a) \end{cases}$$

As will be observed from the Equations (5a), (6a), and (7a), a term $-K_3(\mu/\rho Q)$ is added to the ratio ω/Q of angular velocity to flow rate in the turbulent flow region. This term, however, becomes a negligible value in the turbulent region of high flow rate. Accordingly, no change in the instrumental error characteristics occures in the turbulent flow region. Regarding the transition flow between the laminar flow and the turbulent flow, the ratio ω/Q of rotational angular velocity to flow rate is constant irrespective of the value of the flow rate Q, whereby the instrumental error characteristics become flat down to a relatively low flow rate region.

Figure 2:
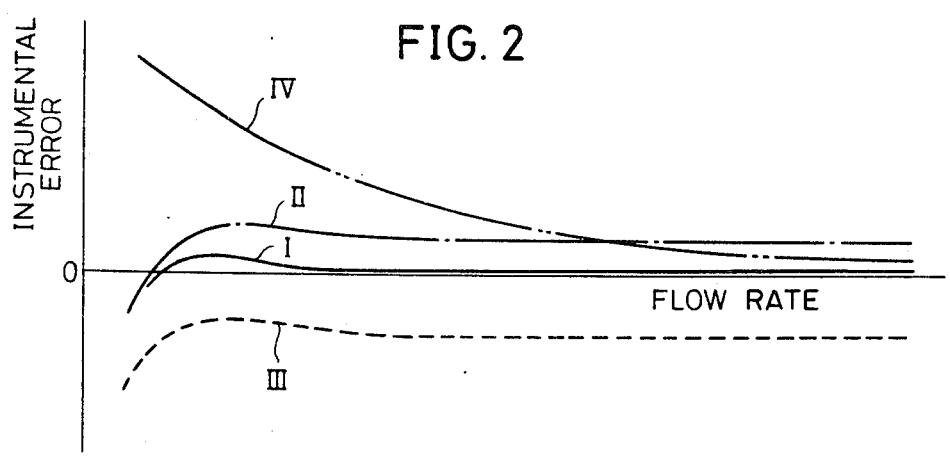
FIG. 2 is a graph showing instrumental error characteristics.

Referring to FIG. 2, curves of full line I and one-dot chain line II respectively show the instrumental errors in the cases of measuring the flow rates of a low-viscosity liquid (for instance, gasoline) and a high-viscosity liquid (for instance, heavy oil) through the use of the turbine flowmeter 10 of the present invention. The other curves of broken line III and two-dot chain line IV respectively show the instrumental errors in the cases of measuring the flow rates of a low-viscosity liquid and a high-viscosity liquid through the use of a turbine flowmeter known heretofore.

Since the turbine flowmeter 10 is provided with the viscous resistance developing section 25, it does not entail any phenomenon in which the instrumental error differs largely depending on the viscosity of the fluid to be measured, as in the case of the known turbine flowmeter, and has instrumental error characteristics which are flat over a large range from a low flow rate region to a high rate region, as will be apparent from FIG. 2.

Next, a second embodiment of the present invention will be described in conjunction with FIG. 3, in which those parts which are the same as equivalent parts in FIG. 1 are designated by like reference numerals, and detailed description of such parts will not be repeated.

In the turbine flowmeter 30 of this embodiment, a down-stream side cone member 19a has a radius approximately equal to that of the hub 16 of the rotor 14 (that is, $r_{CR}=r_H$), and an up-stream side cone member 18a has a radius greater than that of the hub 16 (that is $r_{CF}>r_H$). This arrangement causes the flow of the fluid passed through the clip 12 to be constricted between the conical wall of the up-stream cone member 18a and the inner wall surface of the housing 11 as the fluid is guided along the conical wall of the cone member 18a. The fluid flows up to the outer edge part of maximum diameter of the cone member 18a, forming a boundary layer with respect to the conical wall. The boundary layer, however, separates from the conical wall at the outer edge part of the cone member 18a, and the fluid flow thereby becomes a turbulent flow on the downstream side with respect to the outer edge part.

As a result, the flow velocity distribution of the fluid being measured becomes uniform, and the change in the average radius r of the blades 17 for the fluid to be measured becomes small. Further, the fluid flow becomes a turbulent flow over the whole range from a low flow rate region to a high flow rate region. Accordingly, the instrumental error of the turbine flowmeter 30 becomes constant over a wide range of the flow rate.

Furthermore, the resulting annular part of the cone member 18a projecting radially beyond the periphery of the hub 16 constitutes a viscous resistance developing part 31, and, the fluid being measured is caused to be stagnant within a space defined by the viscous resistance developing part 31 and the outer peripheral surface of the hub 16. As a result, in a state of transition flow between laminar flow and turbulent flow, the variation of the instrumental error can be limited to a very small value.

Figure 3:
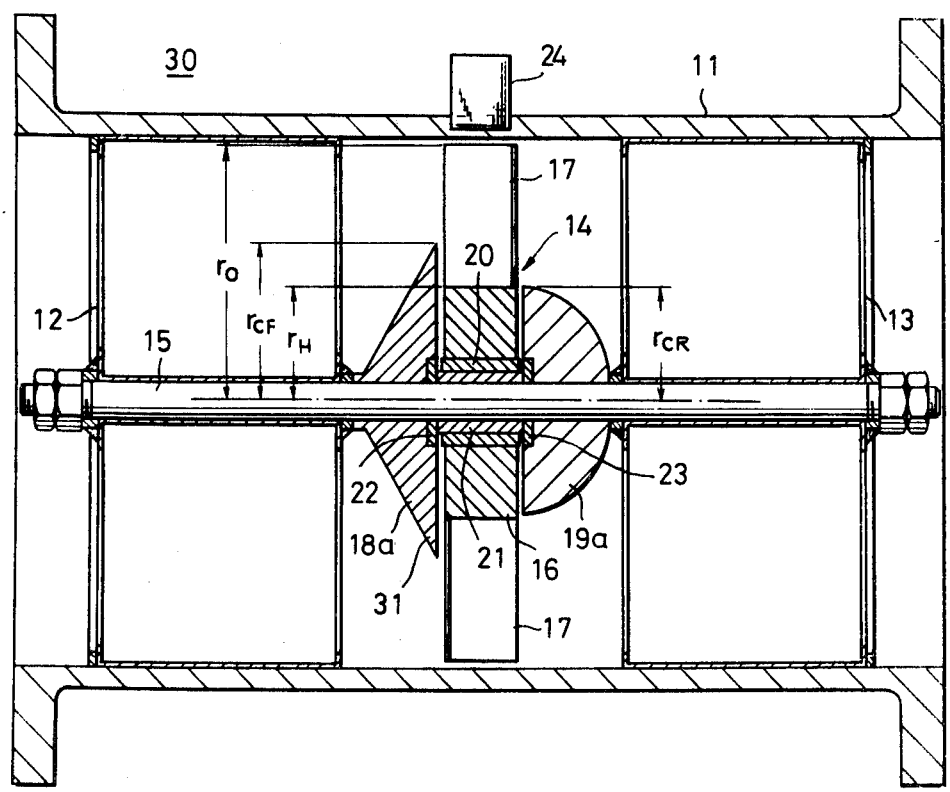
FIG. 3 is a side view, in longitudinal section, showing a second embodiment of the turbine flowmeter of the present invention.
Figure 4:
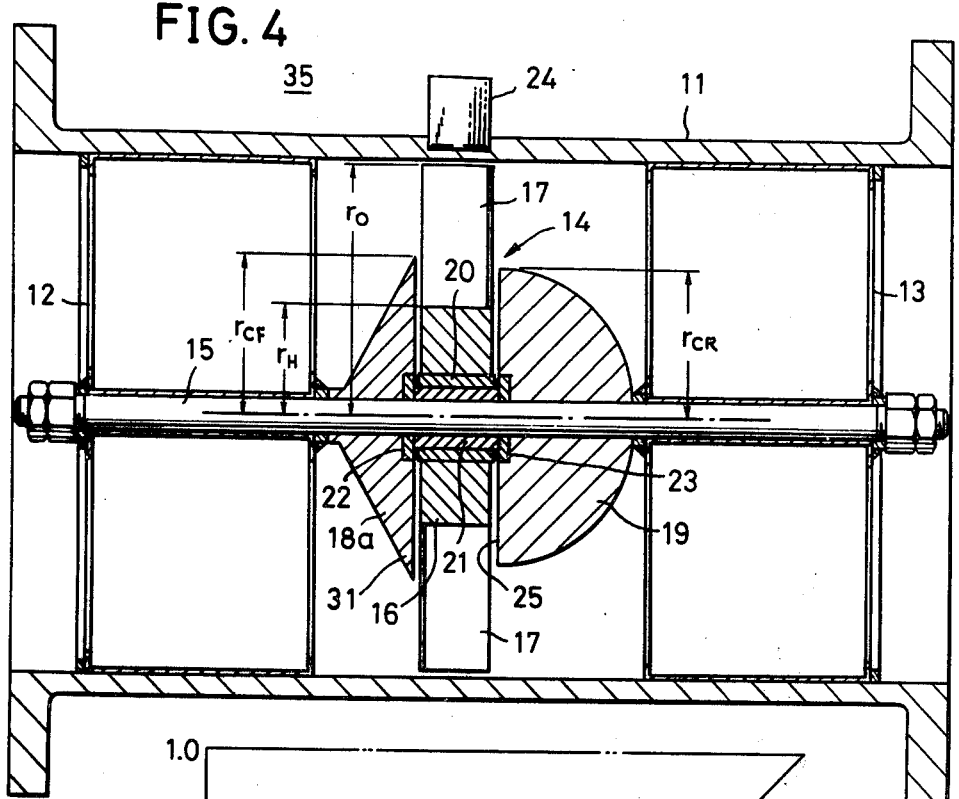
FIG. 4 is a side view, in longitudinal section, showing a third embodiment of a turbine flowmeter of the present invention.

A third embodiment of the present invention is shown in FIG. 4, in which those parts which are the same as corresponding parts in FIGS. 1 and 3 are designated by like reference numerals. Detailed description of such parts will not be repeated.

In a turbine flowmeter 35 of this third embodiment, the cone member 18a on the up-stream side and the cone member 19 on the downstream side have diameters larger than the diameter of the hub 16. Accordingly, an effective stagnant flow part is formed in a pocket part defined between the viscous resistance developing part 31 of the cone 18a and the viscous resistance developing part 25 of the cone 19, which parts 31, 25 project outward from the outer peripheral surface of the hub 16, whereby the rotational resistance torque of the rotor 14 is increased very effectively. Thus, by the construction of this embodiment of the invention, also, improvement in the instrumental error characteristic can be attained by increasing the rotational resistive torque in the low-velocity region, similarly as in each of the preceding embodiments of the invention.

Furthermore, an arrangement wherein the maximum radius $r_{CF}$ of the cone member 18a is slightly larger than the maximum radius $r_{CR}$ of the cone member 19 causes the fluid flow to assume turbulent flow from a relatively low flow rate region, whereby the instrumental error change becomes small, similarly as in the preceding second embodiment of the invention.

Figure 5:
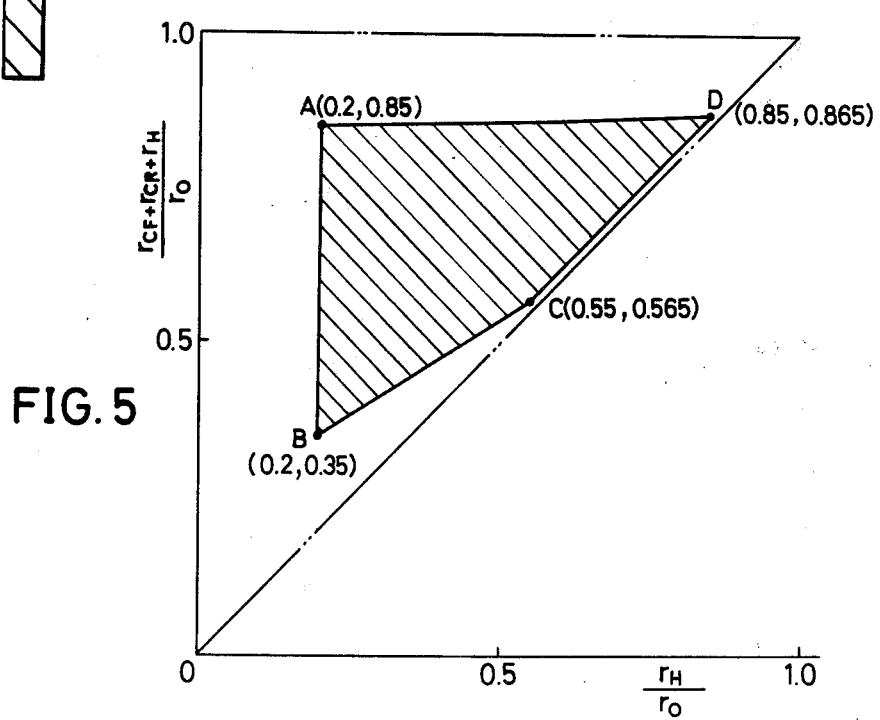
FIG. 5 is a graphical diagram or chart for selecting appropriate values of sizes and shapes of the constituting parts of a turbine flowmeter according to the present invention.

Appropriate dimensions to be selected for the radii of the up-stream cone members 18, 18a, the down-stream cone members 19, 19a, and the hub 16 have been determined through experiments. In the case where $r_H/r_o$ is taken as the abscissa and $(r_{CF}+r_{CR}-r_H)/r_o$ as the ordinate, as illustrated in FIG. 5, it is preferable that the dimension of $R_{CF}+r_{CR}$ is inside of the quadrangle $\overline{ABCD}$ (the part indicated by cross-hatching) defined by four corner points A(0.2, 0.85), B(0.2, 0.35), C(0.55, 0.565), and D(0.85, 0.865).

Figure 6:
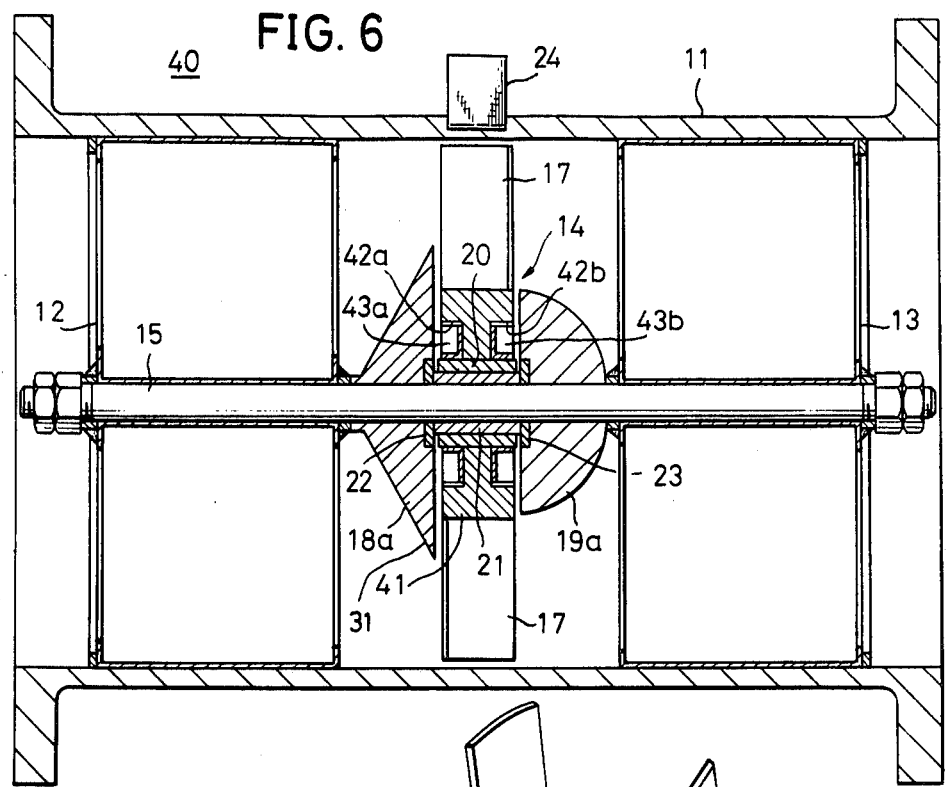
FIG. 6 is a side view, in longitudinal section, showing a fourth embodiment of the present invention.
Figure 7:
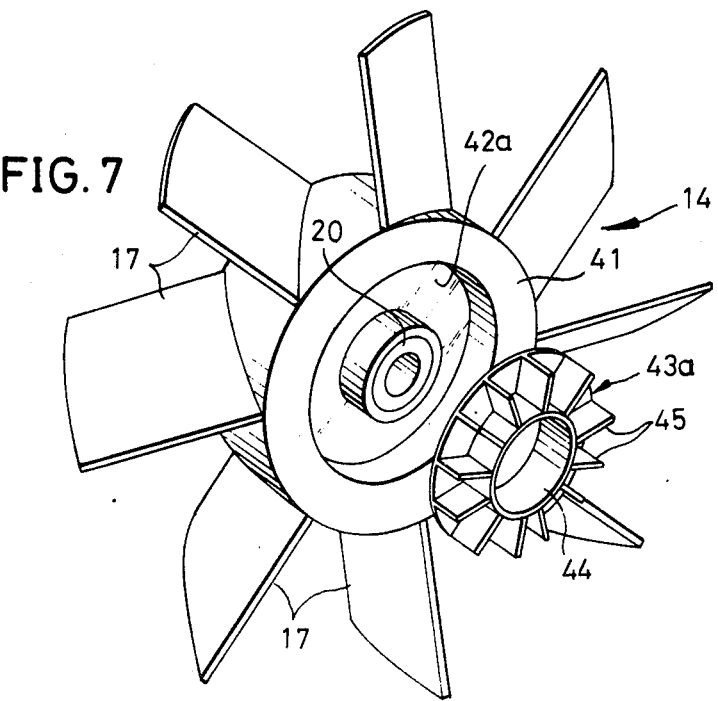
FIG. 7 is an exploded perspective view, showing a blade rotor and a resistance developing structure of the turbine flowmeter illustrated in FIG. 6.

A fourth embodiment of the present invention will now be described with reference to FIGS. 6 and 7. In FIG. 6, those parts which are the same as equivalent parts in FIGS. 1 and 3 are designated by like reference numerals, and detailed description thereof will be omitted.

In a turbine flowmeter 40, there is provided a hub 41 formed, at opposite surfaces thereof, with annular recesses 42a and 42b to serve as stagnant parts. Resistance rings 43a and 43b to serve as resistance force developing structures are disposed within these annular recesses 42a and 42b and are fixed to the inner wall thereof. The resistance ring 43a has a structure, as indicated in FIG. 7, in which a plurality of blades 45 are embeddedly fixed to the outer peripheral surface of a hollow cylindrical main body 44. In this embodiment of the invention, the blades 45 are positioned that respective blade surfaces in planes including the axial centerline.

The other resistance ring 43b has a structure similar to that of the resistance ring 43a.

As the rotor 14 rotates, the resistance rings 43a and 43b rotate unitarily therewith, while pushing aside static fluid lying stagnant between the up-stream side cone member 18a and the hub 41, and between the downstream side cone member 18b and the hub 41 by means of the blades 45. Accordingly, the fluid being pushed aside by the blades 45 of the resistance rings 43a, 43b exerts a rotational resistance torque due to the viscous resistance of the fluid to the rotor 14.

As a result, the instrumental error characteristic of the turbine flowmeter 40 becomes even more flat, in conjunction with the effect attained by making the cone diameter greater than the hub diameter, which effect has been described in the preceding embodiments of the invention.

While, in this embodiment of the invention, a couple of resistance rings 43a, 43b are used as resistance force developing structures, a structure wherein the resistance ring 43a or 43b is fixed to one side surface of the hub 41 may be employed.

An essential part of a fifth embodiment of the present invention is shown in FIG. 8.

In a turbine flowmeter 50 of this embodiment, a plurality of blades 51 to serve as the resistance force developing structure are embeddedly fixed to the right end face (as viewed in FIG. 8) of the hub 16 of the rotor 14 in annular formation. These blades 51 are engaged with or inserted into an annular recess 53 which is formed as a stagnant fluid part on the left end surface of the down-stream side cone member 52. As the rotor 14 rotates, the blades 51 rotate inside of the annular recess 53. As a result of this rotation, the viscous resistance of the fluid filling the annular recess 53 imparts rotational resistance torque to the rotor 14.

In the case of this embodiment, the turbine flowmeter has a simple organization and requires only a simple assembling operation, whereby it can be produced at lower cost than the above described fourth embodiment of the invention.

Embodiments of the invention in which a back pressure receiving plate is fixed to the rotor will now be described. Back pressure acting on the back pressure receiving plate substantially nullifies a thrust force developed in the flow direction in connection with the rotation of the rotor, whereby the rotor operates in floating rotation, and unnecessary mechanical friction between the rotor and the bearing in the thrust bearing section is prevented.

A sixth embodiment of the present invention is illustrated in FIG. 9, in which those parts which are the same as equivalent parts in FIGS. 1 and 3 are designated by like reference numerals, and detailed description thereof will be omitted.

Figure 10:
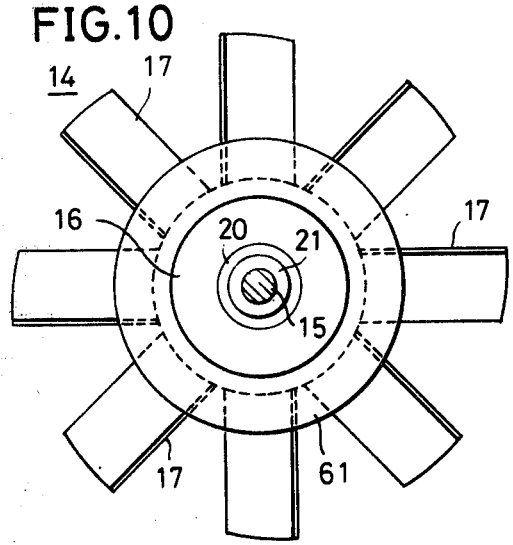
FIG. 10 is a front elevation, showing the blade rotor and blades of the turbine flowmeter shown in FIG. 9.

In a turbine flowmeter 60 of this embodiment, a back pressure receiving plate 61 is fixed to the rotor 14 in a position to confront a viscous resistance developing part 31 of larger diameter of the up-stream cone member 18a, as illustrated in FIG. 10. The pressure receiving plate 61 is an annular plate of an inner radius $r_I$ and outer radius $r_p$. In this embodiment of the invention, the pressure receiving plate 61 is so constructed that the outer radius $r_P$ is approximately equal to the radius $r_{CF}$ of the up-stream cone member 18a, and that the inner radius $r_I$ is less than the radius $r_H$ of the hub 16.

Figure 11:
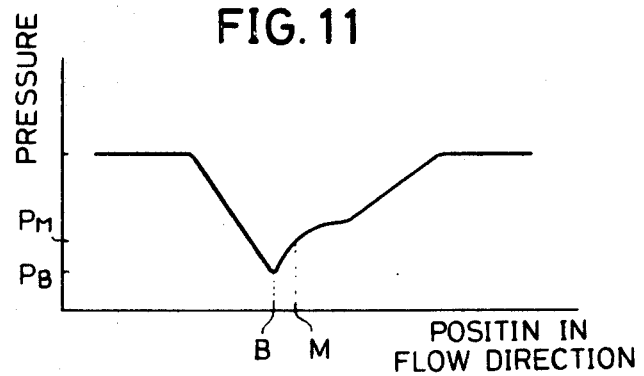
FIG. 11 is a graph showing the distribution of pressure, in the fluid flowing direction, on the pipe wall of the turbine flowmeter shown in FIG. 9.

Accordingly, the fluid which passes over the viscous resistance developing part 31 of the cone member 18a and is dragged into the stagnant part located at the rear of the part 31 pushes the pressure receiving plate 61 from the rear side thereof in the direction opposite to the flow direction. The back pressure applied to the pressure receiving plate 61 becomes a pressure $(P_M - P_B)$, as indicated in FIG. 11, which pressure is obtained by subtracting the static pressure $P_B$ at the up-stream side face (at point B in FIG. 11) of the rotor 14 from the static pressure $P_M$ at an intermediate part (at point M in FIG. 11) in the axial direction of the rotor 14.

Accordingly, the thrust force in the flowing direction applied to the rotor 14 by way of the blade 17 is cancelled or nullified by the axial force due to the differential pressure $(P_M - P_B)$ which is applied to the pressure receiving plate 61 in the direction opposite to the flow direction. The rotor 14 therefore rotates smoothly in a state where the bush 20 is floating between the thrust bearings 22 and 23 (i.e., in a floating state). The arrangement of this embodiment in which the pressure receiving plate 61 is disposed within the stagnant part, that is, the radius $r_p$ of the pressure receiving plate 61 is equal to or smaller than the radius $r_{CF}$ of the cone member 18a, causes the pressure receiving plate 61 preferably to receive less pressure due to the fluid flow and therefore to apply only the back pressure to the rotor 14.

Since the rotor 14 undergoes floating rotation between the thrust bearings 22 and 23, as described above, the problem of the bush 20 rotating while rubbing against the end surface of the thrust bearing 23 on the down-stream side and thus while overcoming a large mechanical friction does not arise. Accordingly, the turbine flowmeter 60 of the above described construction is free from the difficulties of great deterioration of accuracy of measurement due to the mechanical friction at the bearing section and of extreme shortening of the life of the bearing and journal.

Next, a seventh embodiment of the present invention will be described in conjunction with FIG. 12, in which those parts which are the same as equivalent parts in FIG. 1 are designated by like reference numerals, and description thereof is omitted.

In a turbine flowmeter 70 of this embodiment, an annular back pressure receiving plate 71 is fixed to the rotor 14 in a position to confront a viscous resistance developing part 25 of larger diameter of the down-stream side cone member 19b. In this flowmeter 70, the pressure receiving plate 71 is so constructed that its outer radius $r_p$ is smaller than the radius $r_{CR}$ of the down-stream side cone member 19b, and that its inner radius $r_I$ is also smaller than the radius $r_H$ of the hub 16.

A space gap 72 of relatively large width is formed between the cone member 19b and the pressure receiving plate 71 of the rotor 14. The fluid at the outer peripheral part of the stagnant part flows against the outer peripheral end surface of the cone member 19b and then flows into the space gap 72. The pressure receiving plate 71 is subjected to a back pressure due to the flow of the above fluid into the space gap 72.

Here, since the area of the down-stream surface of the hub 16 of the rotor 14 is enlarged by the provision of the pressure receiving plate 71, the pressure receiving area of the rotor 14 to which the above mentioned back pressure is applied is large, whereby a greater thrust force is applied oppositely to the flow direction.

Accordingly, in the same manner as in the preceding embodiment of the invention, the thrust force in the flow direction exerted on the rotor 14 by way of the blades 17 is balanced by the thrust force in the direction opposite to the flow direction caused by the back pressure of the fluid flowing into the space gap 72, whereby the rotor 14 rotates smoothly in a floating condition. Moreover, since the pressure receiving plate 71 is disposed within the stagnant part, the plate 71 is not subjected to a pressure in the fluid flow direction.

Figure 13:
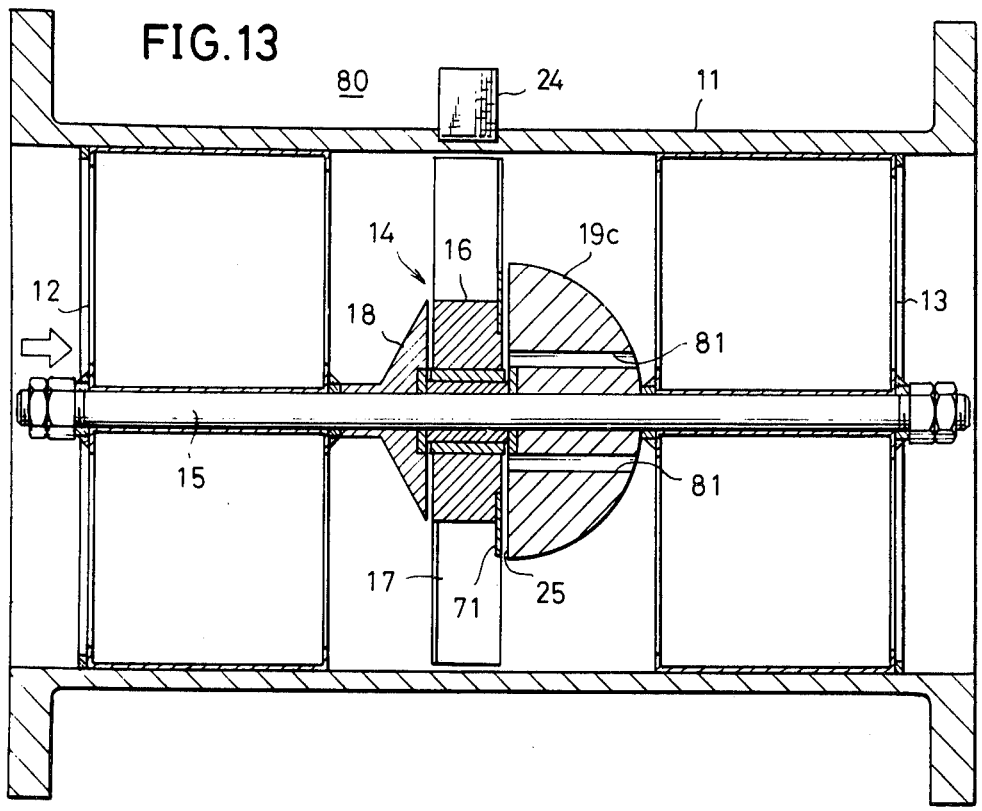
FIG. 13 is a side views in longitudinal section, showing an eighth embodiment of the turbine flowmeter of the present invention.
Figure 14:
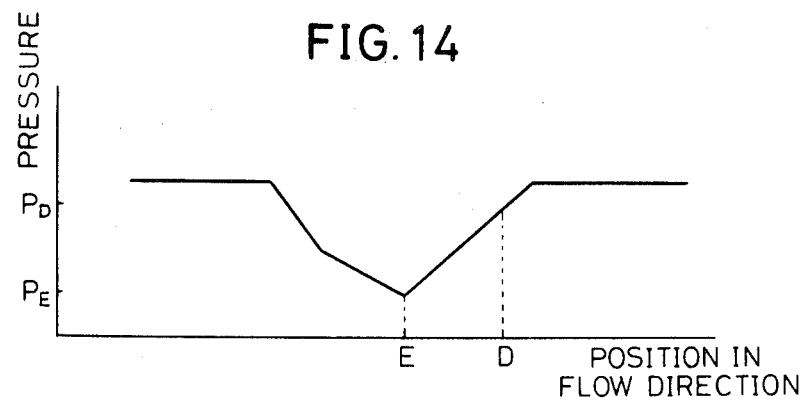
FIG. 14 is a pressure distribution diagram of the turbine flowmeter shown in FIG. 13.

An eighth embodiment of the present invention will now be described with reference to FIGS. 13 and 14. In FIG. 13, those parts corresponding to equivalent parts in FIGS. 1 and 12 are designated by like reference numerals, and description thereof will be omitted.

In a turbine flowmeter 80 of this embodiment, the pressure receiving plate 71 is fixed to the rotor 14, similarly as in the preceding embodiment of the invention.

A plurality of through holes 81 are formed in a downstream side cone member 19c in directions parallel to the shaft 15. Between the pressure receiving plate 71 and the cone member 19c, the wide space gap formed in the preceding embodiment of the invention is not formed.

The fluid passing past the outer peripheral part of the down-stream side cone member 19c is introduced through the through holes 81 into the space between the left surface of the cone member 19c and the right surface of the rotor 14.

Accordingly, the pressure receiving plate 71 and the hub 16 are subjected to the back pressure due to the fluid of high pressure introduced or supplied from the downstream side. The magnitude of this back pressure becomes a value $(P_D - P_E)$, as indicated in FIG. 14, which is obtained by subtracting the static pressure $P_E$ at the down-stream part (at point E in FIG. 14) of the rotor 14 from the static pressure $P_D$ in the vicinity of the down-stream part (at point D in FIG. 14) of the down-stream side cone member 19c. Since the static pressure along the outer peripheral surface of the cone member 19c is progressively restored in the flow direction, the magnitude of the back pressure $(P_D - P_E)$ is large. Further, since the pressure receiving area of the hub 16 is wide, the thrust force in the flow direction exerted on the rotor 14 by way of the blades 17 is cancelled by the thrust force which is developed by the back pressure $(P_D - P_E)$ in the direction opposite to the flow direction, whereby smooth rotation of the rotor 14 in a floating state can be achieved.

Figure 15:
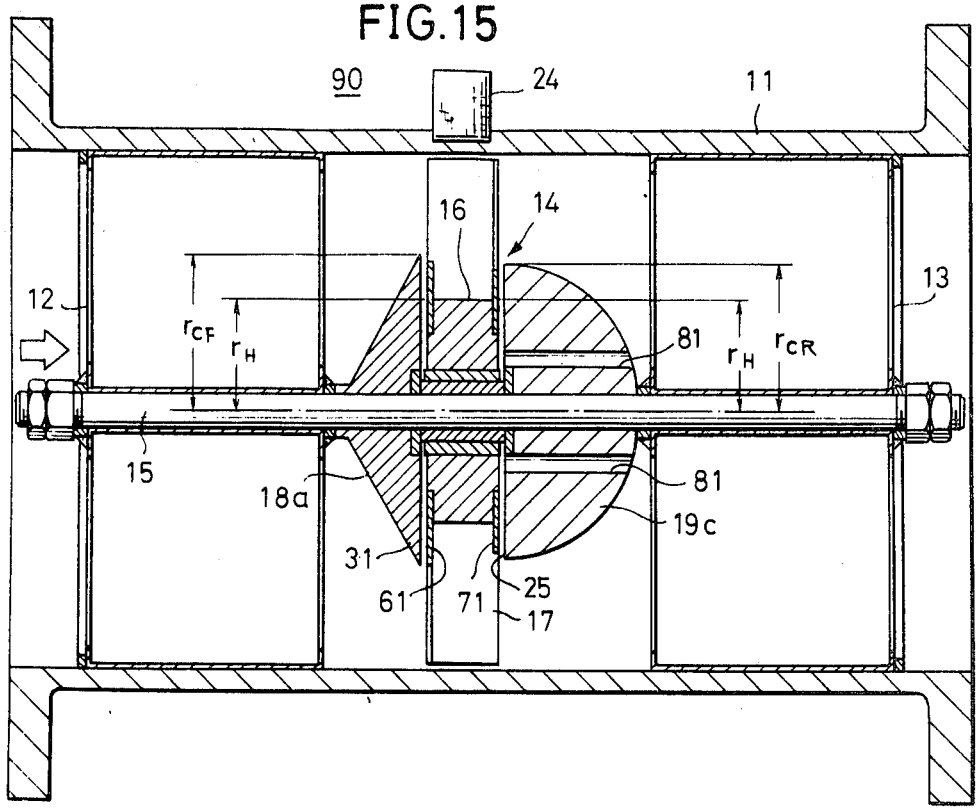
FIG. 15 is a side view, in longitudinal section, showing a ninth embodiment of the turbine flowmeter of the present invention.
Figure 16:
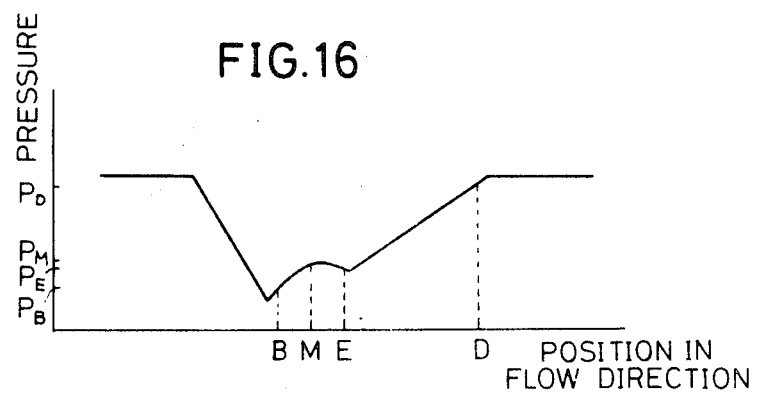
FIG. 16 is a pressure distribution diagram of the turbine flowmeter illustrated in FIG. 15.

A ninth embodiment of the present invention will now be described with reference to FIGS. 15 and 16. This embodiment is a combination of the above described sixth embodiment and eighth embodiment of the invention. In FIG. 15, those parts corresponding to equivalent parts in FIGS. 1, 9, and 13 are designated by like reference numerals, and description thereof will not be repeated.

In a turbine flowmeter 90 of this embodiment, a stagnant fluid part is formed effectively in a pocket part defined by the up-stream side cone member 18a and the down-stream side cone member 19c. This stagnant fluid part thus formed allows the rotational resistance torque of the rotor 14 to increase very effectively.

The back pressure receiving plates 61 and 71 are fixed to the rotor 14, and the through holes 81 are formed in the cone member 19c. Accordingly, to the up-stream side pressure receiving plate 61, the back pressure $(P_B - P_M)$ is applied oppositely to the flow direction. The back pressure is obtained by subtracting the static pressure $P_M$ at the intermediate part (at point M in FIG. 16) in the axial direction of the rotor 14 from the static pressure $P_B$ at the up-stream side face (at point B in FIG. 16) of the rotor 14. Simultaneously, to the down-stream side pressure receiving plate 71, the back pressure $(P_D - P_E)$ is applied oppositely to the flow direction, which back pressure is obtained by subtracting the static pressure $P_E$ at the down-stream side (at point E in FIG. 16) of the rotor 14 from the static pressure $P_D$ introduced through the through holes 81 from near the down-stream end (at point D in FIG. 16) of the cone member 19c. Accordingly, this embodiment of the invention also affords smooth rotation of the rotor 14, in a floating state, similarly as in the preceding embodiments of the invention.

Furthermore, since the back pressure exerted on the rotor 14 is obtained at two places, i.e., at the up-stream and down-stream side pressure receiving plates 61 and 71, a large total back pressure can be obtained. Furthermore, the back pressure obtained can be adjusted appropriately at the above two points, whereby a turbine flowmeter in which the design thereof can be modified with ease can be provided.

Moreover, the arrangement wherein the radius $r_{CF}$ of the up-stream side cone member 18a is slightly larger than the radius $r_{CR}$ of the down-stream side cone member 19c generates a turbulent state from a relatively low flow rate region, thereby resulting in a small change in instrumental error.

Figure 12:
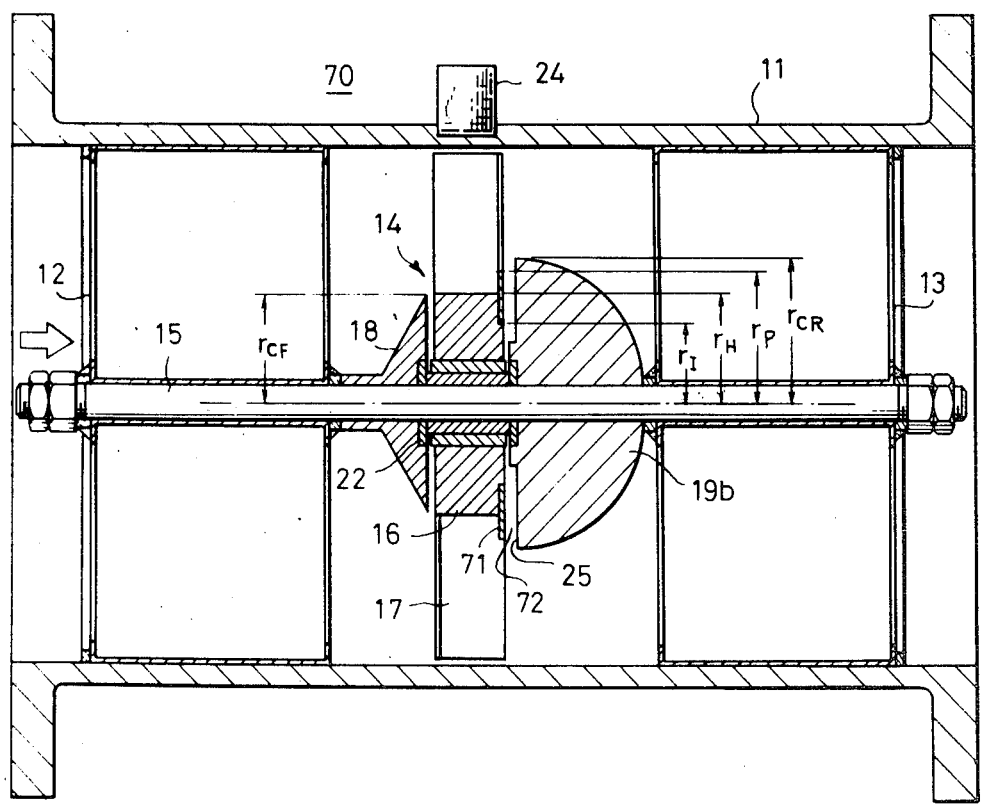
FIG. 12 is a side view, in longitudinal section, showing a seventh embodiment of the turbine flowmeter according to the present invention.

In this flowmeter, the down-stream side cone member 19b of the seventh embodiment of the invention illustrated in FIG. 12 may be alternatively used instead of the down-stream side cone member 19c.

Figure 17:
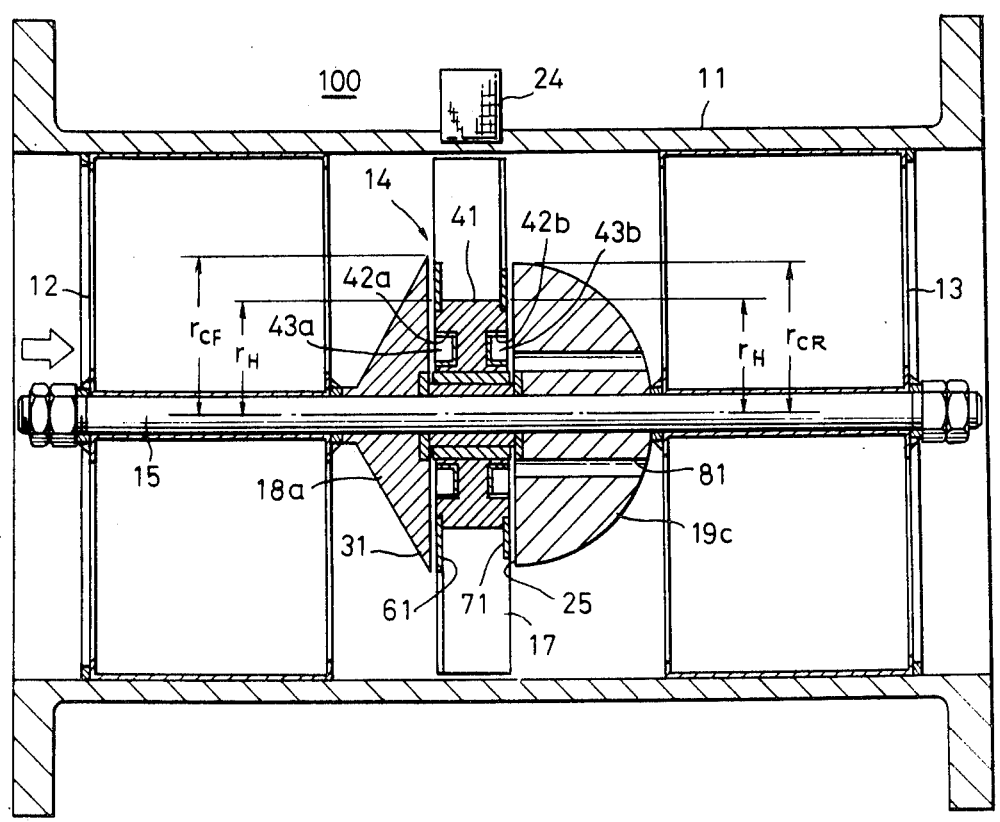
FIG. 17 is a side view, in longitudinal section, showing a tenth embodiment of the turbine flowmeter of the present invention.

Further, a turbine flowmeter 100 of a tenth embodiment of the present invention is illustrated in FIG. 17. This embodiment is a combination of the fourth embodiment and the ninth embodiment of the invention. In FIG. 17, those parts which are the same as equivalent parts in FIGS. 6 and 15 are designated by like reference numerals, and detailed description of this embodiment will be omitted because the operation and effectiveness of the turbine flowmeter 100 can be readily understood from the foregoing description of the preceding embodiments of the invention.

Further, this invention is not limited to these embodiments but various variations and modifications may be made without departing from the scope and spirit of the invention.

What is claimed is:
1. A turbine flowmeter comprising:
   a rotor comprising a hub rotatably supported on a shaft at an axial position of a flowmeter housing and a plurality of blades embeddedly fixed to the outer peripheral surface of said hub;
   means for detecting the rotation of said rotor; a couple of cone members disposed respectively on the up-stream side and the down-stream side in the flow direction of a fluid being measured to confront at least one surface of the hub of said rotor in coaxial alignment with said rotor; and
   a couple of back pressure receiving plates fixed to the end face of the hub of said rotor respectively to confront said up-stream side and down-stream side cone members, said downstream side cone member having therethrough back pressure introducing holes extending from the down-stream surface to the surface confronting said rotor in parallel to the axial direction thereof,
   said back pressure receiving plates respectively extending beyond periphery of the hub of the rotor, the diameter of at least one cone member of said couple of cone members, at the side to confront said rotor, being larger than outer diameter of the hub of said rotor, whereby a stagnant fluid region is formed between the enlarged diameter part of said cone member and the outer peripheral surface of said hub for holding in stagnant state a part of said fluid being measured.

2. A turbine flowmeter as claimed in claim 1 which further comprises an annular recess formed in said hub at a surface to confront said cone member and a plurality of blades disposed within said annular recess so as to rotate unitarily with said hub, whereby said blades are thereby subjected to resistance force due to a part of the fluid being measured stagnating within said recess as said blades rotate unitarily with said hub.

3. A turbine flowmeter comprising: a rotor comprising a hub rotatably supported on a shaft at an axial position of a flowmeter housing and a plurality of blades embeddedly fixed to the outer perpheral surface of said hub; means for detecting the rotation of said rotor; and a couple of cone members disposed respectively on the up-stream and the down-stream side in the flow direction of a fluid being measured to confront at least one surface of the hub of said rotor in coaxial alignment with said rotor, the diameter of at least one cone member of said couple of cone members, at the side to confront said rotor, being larger than outer diameter of the hub of said rotor, whereby a stagnant fluid region is formed between the enlarged diameter part of said cone member and the outer peripheral surface of said hub for holding in stagnant state a part of said fluid being measured; said up-stream side cone member, at the side confronting said rotor being larger than the diameter of the hub of said rotor, and the diameter of the down-stream side cone member, at the side confronting said rotor, is substantially the same as the diameter of said rotor, the fluid being measured which has flowed past said up-stream side cone member flowing thereafter in turbulent flow, a part of said fluid being measured stagnanting between the enlarged diameter part of said up-stream side cone member and the outer peripheral surface of said hub; and a back pressure receiving plate fixed to said rotor and extending beyond the periphery of the rotor to confront said up-stream side cone member.

* * * * *